Patented May 18, 1937

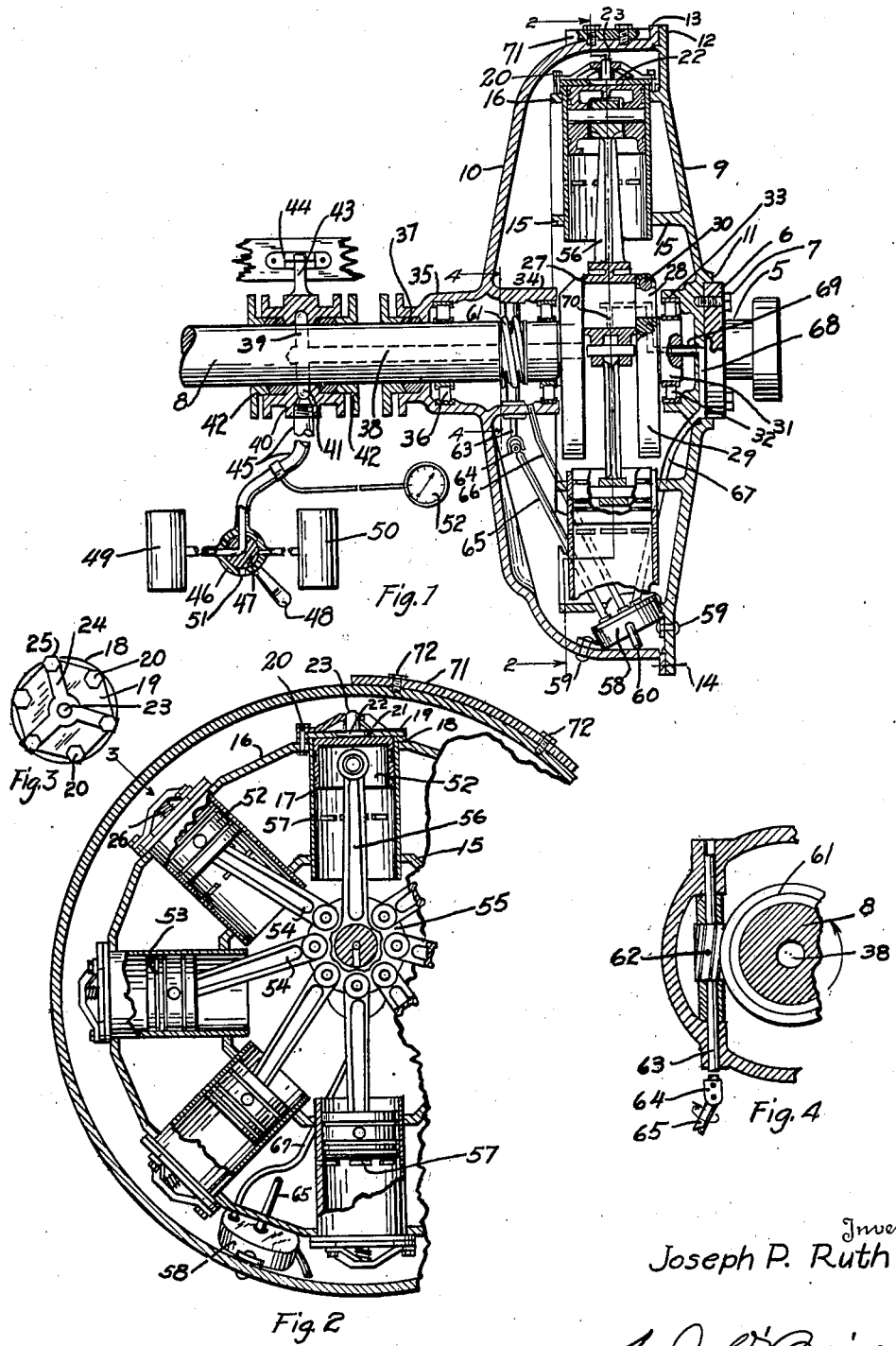

2,080,548

UNITED STATES PATENT OFFICE 2,080,548

TORQUE TRANSMITTER

Joseph P. Ruth, Denver, Colo.

Application July 27, 1934, Serial No. 737,245

12 Claims. (Cl. 192—60)

This invention relates to improvements in means for transmitting torque from a driving to a driven shaft and may be termed a torque transmitter or torque converter.

The use of internal combustion engines which are operated by gaseous fuel or oil and of which there are several types, such, for example, as the ordinary gasoline engine and the Diesel engine, operate at greatest efficiency and exert the biggest torque when they run at a comparatively high speed and therefore when they are attached to a load, for example when an automotive vehicle which is driven by such an engine is started, the engine is connected with the driven parts by means of a clutch and a gear transmission, which makes it possible to have a very low gear ratio in starting and to change the gear ratio after the load has begun to move, thereby giving the engine an opportunity to run at a high speed at all times.

Where locomotives and other heavy automotive vehicles, such as trucks and tractors, are operated by Diesel engines, it is always highly desirable to be able to start the load gradually while the engine is running at the speed at which it delivers its maximum amount of torque, and although this can be effected by means of transmission gears, such gears require a lot of mechanism and in shifting from one gear ratio to another, it is necessary to temporarily disconnect the load from the engine, which is objectionable at all times.

It is the object of this invention to produce a torque transmitter or converter that can be interposed between the driving and the driven shaft of an automotive vehicle, or in any other relation, and which shall be so constructed that the torque can be gradually increased while the driven shaft remains stationary, until a sufficient amount of torque is obtained to start the parts moving.

Another object of this invention is to interpose between the driving and the driven shafts a resilient torque transmitting device that will absorb the vibrations due to the power impulses of the engine, and thereby prevent the formation of harmonic vibrations throughout the mechanism.

This invention, briefly described, consists of an airtight housing that is nonrotatably secured to the driving shaft which is usually the crank shaft of an internal combustion engine, and into which a driven shaft extends in axial alignment with the driving shaft. The driven shaft is rotatably mounted in the housing by means of stuffing boxes that make it possible to obtain a substantially airtight connection between the housing and the driven shaft. Attached to the housing and located on the inside thereof are a plurality of cylinders that are preferably arranged radially and spaced equiangularly from each other. The driven shaft is provided with a crank on which is mounted a connecting rod having one end provided with a bearing that encircles the crank pin, and the other end connected with a piston that is operatively associated with one of the cylinders. The bearing that surrounds the crank pin is so constructed that the other connecting rods can be connected with it so that all of the pistons are operated by the movement of a single crank pin. When the driven shaft rotates relative to the housing the pistons are reciprocated in the cylinders. Each of the cylinders is provided with a cylinder head that in turn is provided with a check valve that opens outwardly so as to permit any gas within the cylinder to be expelled, but which prevents gas from entering, and therefore when the pistons move in a direction to increase the volume of the cylinder chamber, they produce a partial vacuum in the chamber and are therefore moving against the pressure of the gas in the housing. After the pistons have moved to the extreme length of their stroke, they uncover ports in the cylinder walls that permit gas to flow into the cylinder chamber and fill the vacuum and when the pistons move towards the cylinder head, the gas is expelled through the check valve and as the latter can be so arranged that the spring pressure that holds it closed is only slightly greater than that required to overcome the centrifugal force during operation, very little work is expended by the pistons in moving from the extreme open position to the position adjacent the cylinder head. Means is provided for changing the pressure within the housing from a vacuum to any positive pressure desired, and in this way the resistance to the movement of the pistons within the cylinders can be altered at will and the torque exerted by the driving on the driven shaft adjusted to any extent required.

Having thus briefly described the invention and its operation, the invention will now be described in detail, and for this purpose reference will be had to the accompanying drawing in which:

Fig. 1 is a diametrical section taken on line 1—1, Fig. 2;

Fig. 2 is a section taken on line 2—2, Fig. 1;

Fig. 3 is a view looking in the direction of arrow 3, Fig. 2; and

Fig. 4 is a section taken on line 4—4, Fig. 1.

In the drawing reference numeral 5 designates a drive shaft which may be the crank shaft of an internal combustion engine such as a Diesel engine. Secured to the end of this shaft is a flange 6 that is provided with openings for the reception of clamping bolts 7. Reference numeral 8 designates the driven shaft which may be connected to the drive wheels of an automotive vehicle or to any other machine. Attached to the flange 6 by means of the bolts 7 is a housing. This housing consists of two parts which have been designated by reference numerals 9 and 10. The part 9 is substantially circular and has a central depression 11 into which the flange 6 fits in the manner shown in Fig. 1, and to which the flange is secured by the bolts 7. The part 9 is also provided with an outwardly extending flange 12 against which a corresponding flange 13 of the part 10 fits. Bolts 14 extend through the flanges 12 and 13 and hold the same together. The two members 9 and 10, when assembled, form a hollow housing or casing. Projecting inwardly from member 9 are two sets of flanges 15 and 16. The flange 15 is preferably an octagon, while the flange 16 has sixteen sides in the embodiment illustrated on the drawing. Flanges 15 and 16 are provided with radially aligned openings through which the cylinders 17 extend. In the embodiment illustrated there are eight cylinders but any number can be employed. Each cylinder is provided with a flange 18 that projects over and rests against the outer surface of the flange 16. The outer end of each cylinder is closed by a plate 19, that is secured to the flanges 16 and 18 by means of bolts 20. Plates 19 have central openings 21 whose sides form seats for the poppet valves 22. These valves are provided with stems 23 that extend through openings in the centers of guides 24. Each guide 24 is provided with three radial arms and these are attached to the flanges 18 and 19 by means of bolts 25. The valve stems 23 are surrounded by helical compression springs 26, whose tensions are sufficient to resist the centrifugal force produced when the device rotates at its maximum speed. It will be seen that the valves 22 are normally in closed position and they therefore prevent gas from entering the cylinder while permitting gas to be freely expelled.

The driven shaft 8 is provided with a crank pin 27. The end 28 of the crank pin extends through an opening in a crank disk 29. A tapered pin 30 serves to hold the crank pin 28 and the crank disk 29 in assembled position. The crank disk 29 is provided with a circular projection 31 that is concentric with the drive shaft and supported on this projection is a roller bearing 32. The outer ring of the roller bearing is supported on the inner surface of the annular flange 33. Member 10 is provided with an inwardly extending hub 34 and an outwardly extending hub 35. Roller bearings 36 are located in the hubs 34 and 35 and hold the shaft 8 in proper alignment. The outer end of hub 35 is formed with a stuffing box 37 which serves to make an airtight connection between the member 10 and the rotating shaft 8. Shaft 8 is provided with an axial opening 38 that communicates with a diametrical opening 39. Surrounding the shaft at the point where the diametrical opening 39 is located is a ring 40. This ring is provided on its inner surface with an annular channel 41 and at each end with a stuffing box 42. A radius arm 43 is formed integral with the ring 40 and has its end pivotally connected with a stationary bracket 44. The radius arm and the bracket serve to prevent the ring 40 from rotating when the shaft is rotating and also holds the ring against longitudinal movement on the shaft. A pipe 45 has one end threadedly connected with an opening in the ring 40 and is in communication with the annular channel 41. This pipe is provided with a three-way valve 46 that has a rotatable plug 47 which can be turned when force is exerted on the handle 48. The three-way valve is so constructed that it will connect the pipe 45 with either one of three openings. One opening makes a connection between the pipe and a tank 49 which contains air or gas under pressure. Another opening makes a connection with a tank 50 that has the air partially exhausted from it so as to leave a partial vacuum therein, while the other opening, which has been designated by reference numeral 51, makes connection directly with the atmosphere. A pressure gauge 52 is connected with the pipe 45 and indicates the pressure within the pipe, and since this is in direct connection with the interior of the casing formed by members 9 and 10, the pressure gauge 52 also designates the pressure within the housing or casing. If this device is used on a locomotive, the pressure gauge 50 and the three-way valve may be located in the cab.

Slidably connected with each cylinder is a piston 52. These pistons are of ordinary construction and are provided with a number of piston ring grooves and piston rings as indicated by reference numerals 53. The connecting rods 54 are all connected with the bearing 55 that is integral with one end of the connecting rod 56. It will be apparent that whenever the shaft 8 rotates relative to the shaft 5, the several pistons will be reciprocated in their cylinders. Since the valves 22 prevent gas from entering the cylinders, a very high vacuum will be produced in the cylinders when the pistons move towards the center of the housing. After the pistons have moved to the limit of their stroke, they uncover ports 57 as shown in the lowermost cylinder in Fig. 2 and this permits gas from the housing to flow into the piston chamber and fill the vacuum. The ports 57 are made of as large an area as practicable so that the gas can enter the piston chamber very quickly, and as this gas expands it absorbs a large amount of heat, which serves to keep the parts cool as the heat absorbed will theoretically almost balance the heat produced during the compression. Since this device is provided with eight cylinders and pistons and has all the pistons connected to one crank, it is evident that four of the pistons will be simultaneously moving inwardly against the pressure in the housing, while the other four pistons will be moving outwardly. Since gas or air cannot enter the cylinder chamber, the force against which each piston must move is equal to the product of the area of each piston and the differential pressure within the housing. And since the pressure can be regulated from a partial vacuum to any positive pressure, for example, two hundred pounds per square inch or more, it is evident that any desired amount of resistance can be interposed between the driving and the driven shaft to resist relative movement, and therefore the torque exerted by the driving shaft on the driven shaft can be adjusted and gradually built up until the requisite torque is obtained to start the driven shaft rotating after which, by gradually increasing the pressure, the driving and driven shaft can be brought into synchronism and by maintaining the pressure in the housing, the two shafts will be driven at the same speed and the coupling will be effected by the mechanism described in which the torque is resisted by a gas under pressure and since the gas is resilient, the torque transmitting device will absorb the vibrations due to the power impulses in the engine cylinders and transmit an even flow of power to the driven shaft.

For the purpose of keeping the parts lubricated, a gear pump 58 has been provided. This gear pump is located near the periphery of the housing and connected to the latter by bolts or rivets 59. The intake port of the pump has a pipe 60 that extends to a point near the periphery of the casing so as to extend into the layer of oil when the parts are rotating. Since the housing is always rotating when in operation, the centrifugal force tends to keep the oil at the outer periphery and it must therefore be brought to the center by means of the gear pump. The gear pump is driven from a worm gear drive like that illustrated in Figs. 1 and 4 or some equivalent device. In the embodiment illustrated, a worm 61 is secured to the shaft 8 and this co-operates with a worm gear 62 that is connected with a shaft 63. The shaft 63 is provided with a universal connection 64 by means of which it can transmit power to the inclined shaft 65 that extends into the gear pump for the purpose of operating the same. A pipe 66 extends from the exhaust port of the pump to the inside of hubs 34 and 35 and delivers oil to the bearings in these hubs, while another pipe 67 extends from the discharge port to the groove 68 in the bottom of the recess in which the flange 66 is located. The flange 6 covers the groove 68 thereby producing the oil channel that communicates with the pipe 69. This pipe extends into an opening in the center of bearing 31, and this opening is continued until it terminates in an opening 70 that extends diametrically through the piston pin 27. When shafts 5 and 8 rotate relative to each other, the gear pump is rotated to force oil to the crank pin and also to the bearings in hubs 34 and 35. The oil that overflows from the piston pin bearing is thrown outwardly by a centrifugal force and tends to lubricate the cylinders and the wrist pins in the pistons.

For the purpose of balancing the device so as to make up for the unbalancing effect of the gear pump and connecting parts, a counterbalance 71 is connected with the outside of the casing by means of screws 72.

Let us now assume that a device constructed in the manner described in this specification and shown in the drawing is connected between the crank shaft 5 of a Diesel engine and a shaft 8 that transmits power to a differential gear or other mechanism by means of which the drive wheels of an automotive vehicle, such as a heavy truck or a locomotive are rotated. Since a Diesel engine exerts its greatest torque at a speed considerably below the maximum speed at which the engine is capable of running, the engine can be rotated at this maximum torque speed, and the operator, by turning the handle 48, can gradually increase the pressure within the housing, thereby increasing the torque that is applied to the driven shaft until this becomes sufficient to start the parts moving and by controlling the pressure the rate of acceleration can be controlled until the driven shaft is brought into synchronism with the driving shaft, whereupon the valve is so adjusted as to maintain the pressure in the housing at such a value as to hold the two shafts against relative rotation.

If the vehicle is to be stopped without slowing down the engine, the control valve is turned so as to reduce the pressure and this can be effected, first, by moving the valve so as to exhaust the air into the atmosphere, and then if the parts are to idle for a considerable length of time, the valve is still further moved so as to connect the interior of the casing with the vacuum tank 50, because when there is no pressure in the housing, the only resistance to relative rotation between shafts 5 and 8 is caused by the friction of the parts and as these are carefully machined and lubricated, such frictional resistance is very small.

In the foregoing parts of this specification attention has been called to the fact that any number of cylinders can be employed and these can be varied from one to any reasonable number. In the drawing eight cylinders have been shown. If a single cylinder and piston are employed the gas in the casing will be slightly compressed when the piston moves from the cylinder head or from its outermost to its innermost position. Since the volume of the casing is much larger than the cubical displacement caused by the movement of the piston, the effect of the compression is not very great. It must be remembered that no gas can enter the cylinder during the inward movement of the piston and the force resisting this movement is therefore equal to the area of the piston multiplied by the pressure in the casing. As soon as the piston reaches its innermost position, it uncovers the ports in the cylinder wall and gas enters the cylinder and equalizes the pressure on both sides of the piston which can therefore move outwardly without encountering any greater resistance than that required to force the gas by the exhaust valve. When two cylinders are employed they are positioned diametrically opposite each other and therefore the pistons move in opposite directions, but the gas in the casing will still be slightly compressed because the piston that moves outwardly has gas of the same pressure on both sides and does not produce any variation in the volume. Although there is a slight compression of the gas in the chamber, it is not of sufficient importance to make any appreciable change in the operation. Since there is always one piston arriving at maximum open position at the same time that a corresponding piston arrives at maximum closed position, there is very liittle change in the volume of the air or gas within the housing, but whenever a piston arrives at the position shown in the lowermost cylinder in Fig. 2, the gas rushes into the vacuum very quickly and this expansion of the air absorbs a large amount of heat, and therefore the parts are kept from becoming excessively hot, even when they are operating. It should be remembered, however, that this torque transmitting device operates only a comparatively short time as it simply functions during the starting and stopping of the vehicle.

Since the torque exerted on the driven shaft is a function of the pressure in the housing, it is evident that by properly regulating the pressure in the housing, the full torque that the engine is capable of exerting at any speed can be transmitted to the driven shaft, regardless of whether the latter is stationary or rotating and therefore the amount of torque exerted on the driven shaft is entirely independent of the speed ratio between the driving and the driven shafts.

It is, of course, evident that this device is reversible and that shaft 8 can be the driving shaft.

The position of the cylinders shown in the drawing is preferable, but they need not necessarily be arranged radially as it is only necessary that one or more, preferably an even number, be located in the casing and the pistons reciprocated in a predetermined sequence. The cylinders and pistons can also be replaced by a bellows such as a sylphon if desired.

Having described the invention what is claimed as new is:

1. A torque transmitting device for use in transmitting torque from a driving shaft to a driven shaft, comprising, in combination, an airtight casing nonrotatably connected with one of the shafts, the other shaft extending through an opening in the casing wall and positioned in axial alignment with the first shaft, there being an airtight seal between the casing and the shaft that is rotatably connected therewith, means located within the casing for intermittently producing a partially evacuated space as the driving and the driven shafts rotate relative to each other, means for opening a passage from the interior of the casing to the evacuated space when this has attained its maximum volume, whereby, energy derived from the driving shaft and utilized for producing the partially evacuated space will be converted into torque for turning the driven shaft, and means for varying the gas pressure in the casing.

2. A torque transmitting device for use in transmitting torque from a driving to a driven shaft, comprising in combination, an airtight casing nonrotatably secured to one of the shafts and rotatably connected with the other shaft, the last named shaft having a crank pin, a cylinder attached to the other shaft, the cylinder having one end closed by a cylinder head, said cylinder having the axis of its opening extending in a substantially radial direction, a piston in the cylinder, a connecting rod extending between the piston and the crank pin whereby when the driving and the driven shafts turn relative to each other the piston will reciprocate in the cylinder, means for admitting gas from the casing to the interior of the cylinder when the piston reaches its maximum distance from the cylinder head, a check valve in communication with the interior of the cylinder and which opens to allow gas under pressure to pass from the cylinder to the interior of the casing, and means for varying the gas pressure in the casing whereby the force required to move the piston away from the cylinder head can be varied.

3. A torque transmitting device for use in transmitting torque from a driving shaft to a driven shaft in axial alignment therewith, comprising in combination, a hollow casing nonrotatably connected with one of the shafts and rotatably connected with the other shaft by means of an airtight seal, a plurality of cylinders carried by and located within the casing, the outer ends of the cylinders being closed by cylinder heads, a check valve in communication with the interior of each cylinder and arranged to permit a gas to pass from the cylinder into the casing and to prevent its passage in the opposite direction, a piston located in each cylinder, the shaft that is rotatably connected with the casing being provided with means located within the casing for reciprocating the pistons in regular sequence whereby when the two shafts rotate relative to each other the pistons will be reciprocated in the cylinders, thereby producing a partial vacuum in each cylinder when the piston moves away from the cylinder head, the cylinders having ports so located that they will be uncovered when the pistons reach their maximum distance from the cylinder heads, and means for controlling the gas pressure in the casing.

4. A torque transmitting device consisting of a driving and a driven shaft, an airtight casing connected to one of the shafts so as to be rotated thereby, the other shaft extending through the casing wall and rotatably connected therewith by means of an airtight seal, a cylinder located within the chamber and attached to the chamber wall, a piston located in the cylinder, an exhaust valve connected with the interior of the cylinder, means for reciprocating the piston in the cylinder when the shafts rotate relative to each other, the cylinder having intake ports so located that they will be uncovered by the piston when it is at its maximum distance from the closed end of the cylinder, and means for varying the pressure in the casing.

5. A torque transmitter operable to operatively interconnect coaxial driving and driven elements comprising cooperating elements separately engaging said driving and driven elements and relatively reciprocable to permit independent actuation of the latter, a pressure chamber including said relatively reciprocable elements in fixed relation with one group thereof, and means selectively operable to vary the pressure within said chamber.

6. A torque transmitter operable to operatively interconnect coaxial driving and driven elements comprising cooperating elements separately engaging said driving and driven elements and relatively reciprocable to permit independent actuation of the latter, a pressure chamber including said relatively reciprocable elements in fixed relation with one group thereof, means automatically operable to proportion the resistance to free reciprocation between the reciprocable elements to the pressure within said chamber, and means selectively operable to vary the pressure within said chamber.

7. A torque transmitter operable to operatively interconnect coaxial driving and driven elements comprising cooperating elements separately engaging said driving and driven elements and relatively reciprocable to permit independent actuation of the latter, a pressure chamber including said relatively reciprocable elements in fixed relation with one group thereof, independent fluid pressure supply means, a fluid pressure conduit operatively connecting said supply means with said chamber, and valve means in controlling relation with said conduit selectively operable to vary the pressure within said chamber.

8. A torque transmitter operable to operatively interconnect coaxial driving and driven elements comprising cooperating elements separately engaging said driving and driven elements and relatively reciprocable to permit independent actuation of the latter, a pressure chamber including said relatively reciprocable elements in fixed relation with one group thereof, independent fluid pressure supply means, a bore communicating through one of said coaxial elements with the interior of said chamber, a fluid pressure conduit operatively connecting said supply means with said bore exteriorly of said chamber, and valve means in controlling relation with said conduit selectively operable to vary the pressure within said chamber.

9. In a torque transmitter, the combination with relatively rotatable, coaxial driving and driven elements of a pressure chamber in fixed relation with one and rotatable relation with the other of said elements, cylindrical guides in fixed, radially-disposed relation within said chamber, pistons reciprocably engaging said guides and eccentrically engaging said relatively rotatable element, means automatically operable to proportion the resistance to reciprocation between said pistons and guides to the pressure within said chamber, and means selectively operable to vary the pressure within said chamber.

10. In a torque transmitter, the combination with relatively rotatable, coaxial driving and driven elements of a pressure chamber in fixed relation with one and rotatable relation with the other of said elements, cylindrical guides in fixed, radially-disposed relation within said chamber, pistons reciprocably engaging said guides and eccentrically engaging said relatively rotatable element, means automatically operable to proportion the resistance to reciprocation between said pistons and guides to the pressure within said chamber, independent fluid pressure supply means operatively communicating with said chamber, and valve means controlling the communication between said chamber and said supply means selectively operable to vary the pressure within said chamber.

11. In a torque transmitter having relatively rotatable coaxial driving and driven elements, a pressure chamber in fixed relation with one and rotatable relation with the other of said elements, cylindrical guides in fixed, radially-disposed relation within said chamber and pistons eccentrically engaging said relatively rotatable element in relatively reciprocable relation with said guides, means automatically operable to proportion the resistance to reciprocation between said pistons and guides to the pressure within said chamber, said means comprising closure members on the outer ends of said guides, a pressure-responsive, non-return valve in each of said closure members operable to permit escape of fluid from each guide cylinder during the compression stroke of its associated piston, and intake openings in the wall of each guide cylinder positioned for free communication therethrough between said chamber and the interior of each guide cylinder adjacent the limit of the suction stroke of each piston relative to its associated guide cylinder.

12. In a torque transmitter having relatively rotatable coaxial driving and driven elements, a pressure chamber in fixed relation with one and rotatable relation with the other of said elements, cylindrical guides in fixed, radially-disposed relation within said chamber and pistons eccentrically engaging said relatively rotatable element in relatively reciprocable relation with said guides, means automatically operable to proportion the resistance to reciprocation between said pistons and guides to the pressure within said chamber, said means comprising closure members on the outer ends of said guides, a pressure-responsive, non-return valve in each of said closure members operable to permit escape of fluid from each guide cylinder during the compression stroke of its associated piston, and intake openings in the wall of each guide cylinder positioned for free communication therethrough between said chamber and the interior of each guide cylinder adjacent the limit of the suction stroke of each piston relative to its associated guide cylinder; together with means selectively operable to vary the pressure within said chamber.

JOSEPH P. RUTH.